J. O. HOWARD.
TIRE PROTECTOR.
APPLICATION FILED JUNE 8, 1914.
1,200,355.
Patented Oct. 3, 1916.
2 SHEETS—SHEET 1.
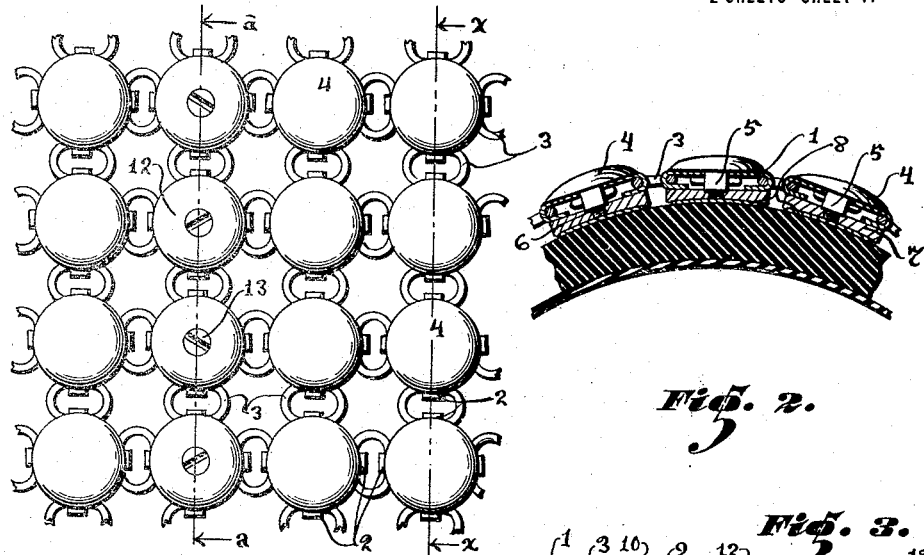
Fig. 1.
Fig. 2.
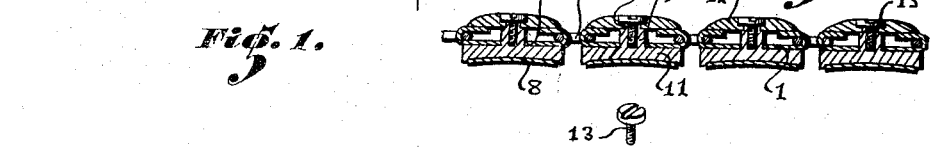
Fig. 3.
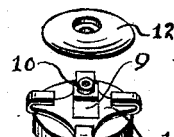
Fig. 4.
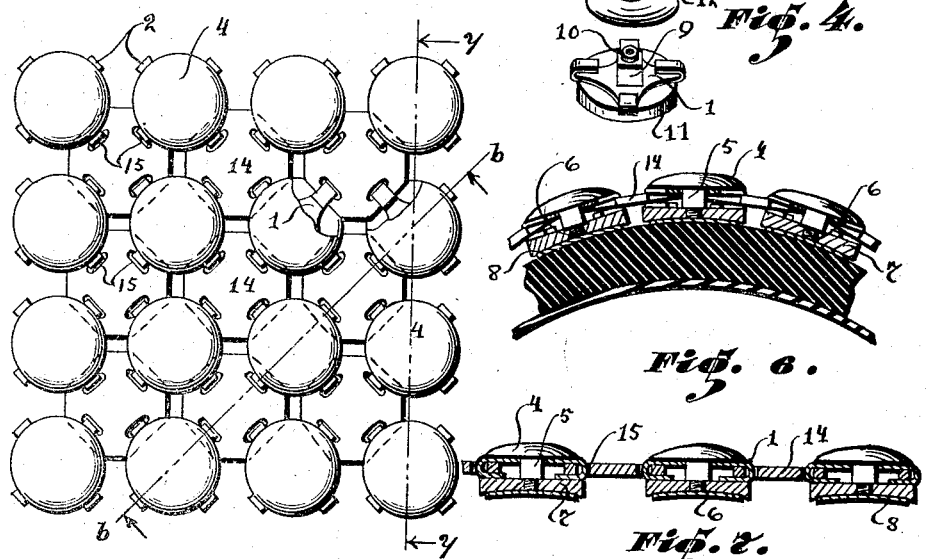
Fig. 5.
Fig. 6.
Fig. 7.
WITNESSES:
C. A. Ellis
R. E. Bruckner
INVENTOR
J. O. Howard
BY
John M. Spellman
ATTORNEYS

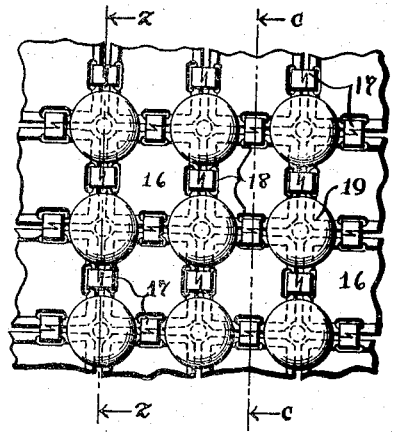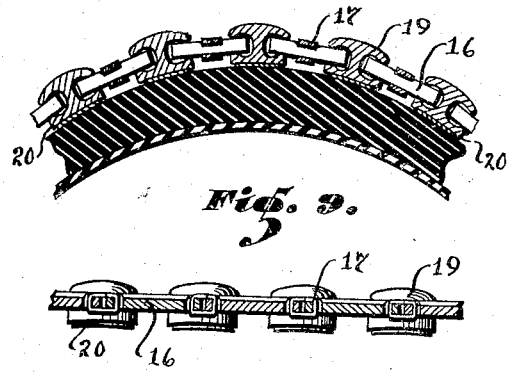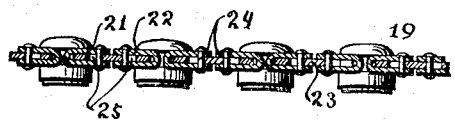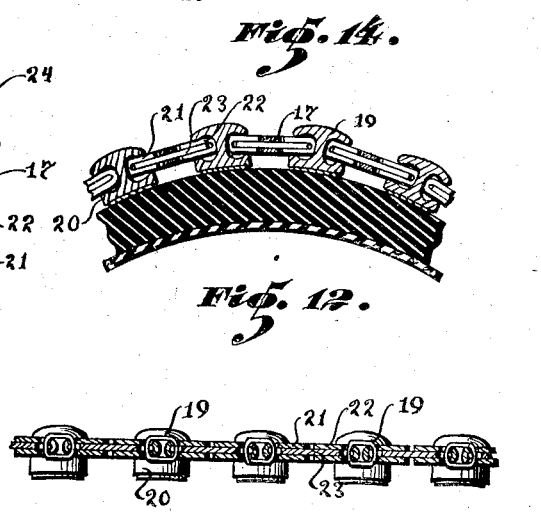

UNITED STATES PATENT OFFICE.

JOSEPH O. HOWARD, OF AUSTIN, TEXAS.

TIRE-PROTECTOR.

1,200,355.  Specification of Letters Patent.  Patented Oct. 3, 1916.

Application filed June 8, 1914. Serial No. 843,650.

*To all whom it may concern:*

Be it known that I, JOSEPH O. HOWARD, a citizen of the United States, residing at Austin, in the county of Travis and State of Texas, have invented certain new and useful Improvements in Tire-Protectors, of which the following is a specification.

My invention relates to a new and useful flexible metallic tire protector, and its object is to provide a tire protector, the use of which will positively insure a tire against injury from tacks, nails, glass or similar objects which are apt to cut or damage an unprotected tire.

It is another object of the invention to provide a metallic tire protector that will combine perfect flexibility with great strength and durability, and which will be so formed that its constituent parts may be stamped out at a comparatively low cost of manufacture.

Finally it is the object of my invention to provide a device of the character described, that will be strong, durable, simple and efficient and comparatively easy to construct.

With these and various other objects in view, my invention has relation to certain novel features of the construction and use, an example of which is described in the following specification, and is illustrated in the accompanying drawings, wherein:

Figure 1 is a top or exterior view of a fragmentary portion of my metallic tire protector. Fig. 2 is a sectional view taken upon the line $x$—$x$ of Fig. 1, showing the protector applied to a tire. Fig. 3 is a sectional view taken upon the line $a$—$a$ of Fig. 1. Fig. 4 is a detail perspective view, showing the disassembled parts of a metallic stud, a plurality of which are used to provide the wearing surface of my tire protector. Fig. 5 is a top or exterior view showing a portion of a modified form of my tire protector.
Fig. 6 is a sectional view of the same, the section being taken upon the line $y$—$y$ of Fig. 5. Fig. 7 is another sectional view of the modification, the section being taken upon the line $b$—$b$ of Fig. 5. Fig. 8 is a top or exterior view of another modification of my invention. Fig. 9 is a sectional view of the same taken upon the line $z$—$z$ of Fig. 8. Fig. 10 is a sectional view taken upon the line $c$—$c$ of Fig. 8. Fig. 11 is a top or exterior view showing still another modified form of my invention. Fig. 12 is a section taken upon the line $d$—$d$ of Fig. 11. Figs. 13 and 14 are respectively sectional views taken upon the lines $e$—$e$ and $f$—$f$ of Fig. 11.

Referring now more particularly to the drawings, wherein like reference characters designate similar parts in all the figures, the numeral 1 denotes a plurality of metallic plates, each of which is formed with four equidistant hooks 2, having a radial relation to the center of the plate. Each hook of each plate 1 is connected with one of the hooks of another plate 1 by an oval shaped wire link 3, so proportioned as to permit a slight space to intervene between the two connected hooks, when the tire protector is stretched. To prevent the links 3 becoming disengaged from the correlated hooks, and to also give to the tire protector a durable wearing surface, a plurality of composite studs are employed. Each stud comprises a head 4 of convex shape, and a shank integrally projecting from the center of said head, comprising a square portion 5 adjacent to the head and a threaded end portion 6, which engages in a disk shaped nut 7. The square portion 5 of each stud is engaged within a similarly shaped aperture centrally formed in one of the plates 1. The heads 4 abut against the top surfaces of the plates 1, while the nuts 7 are contiguous with the ends of the hooks 2 and are screwed tight against shoulders formed at the junctures of the parts 5 and 6 of the stud shanks. That face of each nut 7 which comes adjacent to the tire will preferably be concaved to conform to the tire curvature. Each nut 7 is dished to receive a disk-shaped member 8 formed preferably of cork, said member being interposed between the tire and the studs to protect the tire from being worn or cut through contact with the metal studs. By linking together a sufficient number of the plates 1, and correlating the metallic studs with each face, there is formed an elongated flexible band of such length as to be adapted to encircle a tire.

The manner of establishing a joint between the extremities of the elongated band is illustrated in Fig. 3. The plates 1 at the joint are the same as throughout the entire belt, but the studs differ in that the members 9 and 10 forming the stud shanks are in this instance formed integral with heads 11, which at the joint occupy the position elsewhere occupied by the nuts 7. The portion 9 of each shank which comes adjacent to the correlated heads 11 is squared as at 4 to engage within a central aperture of the correlated plates 1, but the reduced end portions 10 of the shank at the joint are not threaded. Said parts 10 in this instance serve merely to center thread members 12 having precisely the same shape as the member 4 and centrally apertured to receive the members 10. The member 12 of each stud is held in a rigid relation with the other parts of said stud by a screw 13 entering the stud shank and having its head counter-sunk in said member 12 as is clearly illustrated in Figs. 1 and 3. The protective cork member 8 elsewhere receiving each of the nuts 7 is at the joint made to receive each of the heads 11. To disengage the two joined ends of the tire protector it is necessary merely to remove the screws 13, whereupon the studs may be withdrawn from the joint and the series of hooks 2 on the plates 1 from which the studs were removed may be disengaged from the correlated links 3.

In that modified form of my invention, which is illustrated in Figs. 5, 6 and 7, the hooked plates 1, and the studs correlated with said plates remain as in the first described form of my invention, and will be maintained in substantially the same spaced relation. In this modification, the links 3 are eliminated, and in their stead, a plurality of metallic octagonal plates 14 are used, each formed with four slots 15 equidistant from each other and from the center of the plates, and each plate 14 being equidistant from four of the plates 1 each having one of its hooks 2 engaging in one of the slots 15 of said plates. In this construction as in the first described form of my invention, the heads 4 of the studs will take all of the wear.

In that form of my invention which is illustrated in Figs. 8, 9 and 10, there are used a plurality of substantially square metallic plates 16, the corners of which are clipped. These plates are slightly spaced one from another, and a connection is established between each two adjacent plates by an oval metal link 17 considerably wider than the links used in the first described form of my device. Each link 17 is passed through two slots 18, respectively formed in the two joined plates near their parallel edges. The ends of each link 17 are dovetailed together as is clearly shown in Fig. 8, so that said ends may not readily pull apart when the link is placed under a strain. Between the clipped corners of each four closely adjacent plates 16, there is formed an aperture through which is passed the shank of a stud 19 having integral heads overhanging both faces of the four adjacent plates 16. The top or exterior head of said studs constitutes the tread or wearing surface of my tire protector, while the interior or underside heads are incased as before by a disk shaped member 20 formed of cork and serving to protect the tire from direct contact with the studs.

In the fourth modified form of my device (illustrated in Figs. 11, 12, 13 and 14), there are substituted for the plates 16, three-part extensible plates, each comprising parts 21, 22 and 23, the extensibility being transverse of the tire protector and consequently transverse of any tire to which the tire protector may be applied. The members 21 and 22 are U-shaped and incase opposite halves of the plates 23. In each of the members 21 and 22, there are mounted fast two spaced pins 24, each of which passes through a slot 25 formed in the plates 23. Each pair of the pins 24 are in an alinement longitudinally of the tire protector. Connection is established between the three part plates by links 17 as has been already described in connection with the device illustrated in Figs. 8, 9 and 10, and the studs used with the extensible tire protector are also exactly the same as the studs 19 already described. A tire equipped with the above-described type of tire protector will be positively insured against injury from any sharp obstacles that may be encountered in the path of the wheel carrying the tire.

The invention is presented as including all such modifications and changes as properly come within the scope of the following claims.

What I claim is:

1. In a tire protector, a metallic stud formed of a head, a shank and a concave base, in combination with a layer of elastic material held to position in said base.

2. In a tire protector, a metallic stud comprising a head, a shank and a concave base in combination with a layer of cork held to position in said base.

In testimony whereof I have signed my name to this specification in the presence of two subscribing witnesses.

JOSEPH O. HOWARD.

Witnesses:
J. A. SCRUGGS,
PAT MALONE.

Copies of this patent may be obtained for five cents each, by addressing the "Commissioner of Patents, Washington, D. C."